(12) United States Patent
Bitto et al.

(10) Patent No.: US 12,098,939 B2
(45) Date of Patent: Sep. 24, 2024

(54) MEASURING TUBE ARRANGEMENT AND CARRIER UNIT OF A MEASURING DEVICE FOR DETECTING A PARAMETER OF A FLOWABLE MEDIUM

(71) Applicant: Endress+Hauser Flowtec AG, Reinach (CH)

(72) Inventors: Ennio Bitto, Aesch (CH); Hao Zhu, Freising (DE); Martin Josef Anklin, Dornach (CH); Wolfgang Drahm, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 177 days.

(21) Appl. No.: 17/757,370

(22) PCT Filed: Nov. 20, 2020

(86) PCT No.: PCT/EP2020/082922
§ 371 (c)(1),
(2) Date: Jun. 15, 2022

(87) PCT Pub. No.: WO2021/121867
PCT Pub. Date: Jun. 24, 2021

(65) Prior Publication Data
US 2023/0009321 A1 Jan. 12, 2023

(30) Foreign Application Priority Data
Dec. 16, 2019 (DE) .......................... 102019134604.5

(51) Int. Cl.
*G01F 1/84* (2006.01)
(52) U.S. Cl.
CPC .......... *G01F 1/8413* (2013.01); *G01F 1/8477* (2013.01)

(58) Field of Classification Search
CPC .... G01F 1/8468; G01F 1/8472; G01F 1/8477; G01F 1/84–8409; G01F 1/8418–8463; G01F 1/8481–8495
See application file for complete search history.

(56) References Cited

U.S. PATENT DOCUMENTS

| | | | | |
|---|---|---|---|---|
| 5,349,872 A | * | 9/1994 | Kalotay | ................ G01F 1/8413 73/861.355 |
| 6,138,517 A | * | 10/2000 | Laursen | ................ G01F 1/8409 73/861.355 |

(Continued)

FOREIGN PATENT DOCUMENTS

| | | |
|---|---|---|
| DE | 8814606 U1 | 8/1989 |
| DE | 19831505 A | 7/1998 |

(Continued)

*Primary Examiner* — Justin N Olamit
(74) *Attorney, Agent, or Firm* — Christopher R. Powers; Endress+Hauser (USA) Holding, Inc.

(57) ABSTRACT

A measuring tube arrangement of a measuring device for detecting a mass flow rate of a flowable medium includes: two measuring tubes for conducting the medium, wherein the measuring tubes each have an inlet and an outlet, wherein the measuring tubes are bent at least once between the inlet and outlet; a coupler arrangement for mechanically coupling the two measuring tubes, wherein the coupler arrangement has at least two coupler elements, wherein one coupler element is arranged at the inlet, and one coupler element is arranged at the outlet; two magnet arrangements, each having at least two magnets, arranged on the measuring tubes, wherein precisely one magnet arrangement is arranged on one measuring tube; and a connecting body configured to mechanically detachably connect the measuring tube arrangement to a carrier unit, wherein the connecting body is connected to the inlet and to the outlet of the respective measuring tubes.

19 Claims, 5 Drawing Sheets

(56) References Cited

U.S. PATENT DOCUMENTS

| | | | |
|---|---|---|---|
| 6,308,580 B1 * | 10/2001 | Crisfield | G01F 1/8413 |
| | | | 73/861.355 |
| 7,100,456 B2 | 9/2006 | Bitto et al. | |
| 9,939,303 B2 * | 4/2018 | Regen | B29D 23/001 |
| 10,209,113 B2 * | 2/2019 | Young | G01F 15/006 |
| 10,794,744 B2 * | 10/2020 | Skinkle | G01F 1/8409 |
| 2004/0045369 A1 | 3/2004 | Bitto et al. | |
| 2006/0010991 A1 | 1/2006 | Woods et al. | |
| 2010/0005906 A1 | 1/2010 | Shimizu | |
| 2015/0323362 A1 | 11/2015 | Sun | |

FOREIGN PATENT DOCUMENTS

| | | |
|---|---|---|
| DE | 102015120087 A1 * | 5/2017 |
| EP | 1296119 | 3/2003 |
| EP | 1807681 A2 | 7/2007 |
| JP | 2003121234 A | 4/2003 |
| JP | 2011058950 A | 3/2011 |
| WO | 2011099989 A1 | 8/2011 |
| WO | 2019017891 A1 | 1/2019 |

* cited by examiner

MEASURING TUBE ARRANGEMENT AND CARRIER UNIT OF A MEASURING DEVICE FOR DETECTING A PARAMETER OF A FLOWABLE MEDIUM

CROSS-REFERENCE TO RELATED APPLICATIONS

The present application is related to and claims the priority benefit of German Patent Application No. 102019134604.5, filed on Dec. 16, 2019, and International Patent Application No. PCT/EP2020/082922, filed Nov. 20, 2020, the entire contents of which are incorporated herein by reference.

TECHNICAL FIELD

The invention relates to a measuring tube arrangement and a carrier unit of a measuring device for detecting a mass throughflow, a viscosity, a density, and/or a variable derived therefrom, of a flowable medium; a measuring tube system; and a measuring device for detecting a mass throughflow, a viscosity, a density, and/or a variable derived therefrom, of a flowable medium.

BACKGROUND

Process measurement technology field devices with a sensor of the vibration type and especially Coriolis flow meters have been known for many years. The basic structure of such a measuring device is described in, for example, EP 1 807 681 A1, wherein reference is made in full to this publication with respect to the structure of a generic field device within the scope of the present invention.

Typically, Coriolis flow meters have at least one or more vibratable measuring tubes which can be set into vibration by means of a vibration exciter. These vibrations are transmitted along the tube length and are varied by the type of flowable medium located in the measuring tube and by its flow rate. At another point in the measuring tube, a vibration sensor or, in particular, two vibration sensors spaced apart from one another can record the varied vibrations in the form of a measurement signal or a plurality of measurement signals. An evaluation unit can then determine the mass throughflow, the viscosity, and/or the density of the medium from the measurement signal(s).

Coriolis flow meters with interchangeable disposable measuring tube arrangements are known. For example, in WO 2011/099989 A1, a method is thus taught for producing a monolithically formed measuring tube arrangement of a Coriolis flow meter with bent measuring tubes, wherein the measuring tube body of the respective measuring tubes is at first formed as a solid made up of a polymer, and the channel for conducting the flowable medium is subsequently machined into said solid. WO 2011/099989 A1, like U.S. Pat. No. 10,209,113 B2, teaches a connecting body which is configured to receive and support a replaceable measuring tube arrangement comprising thin-walled plastic tubes.

SUMMARY

The invention is based on the object of providing an alternative disposable concept for Coriolis flow meters.

The object is achieved by the measuring tube arrangement, the measuring tube system, the carrier unit, and the measuring device according to the present disclosure.

The measuring tube arrangement, according to the invention, of a measuring device for detecting a mass throughflow, a viscosity, a density, and/or a variable derived therefrom, of a flowable medium, comprises:
  two measuring tubes, which run, in particular, in parallel to one another, for conducting the flowable medium, wherein the measuring tubes each have an inlet with an inlet direction and an outlet with an outlet direction, wherein the measuring tubes are bent at least once between inlet and outlet;
  a coupler arrangement for mechanically coupling the two measuring tubes,
  wherein the coupler arrangement has at least two coupler elements,
    wherein at least one coupler element is arranged at the inlet,
    wherein at least one coupler element is arranged at the outlet;
  two magnet arrangements which are arranged on the measuring tubes,
  wherein precisely one magnet arrangement is arranged on one measuring tube;
    wherein the magnet arrangements each have at least two magnets; and
  a connecting body which is configured to mechanically detachably connect the measuring tube arrangement to a carrier unit,
wherein the connecting body is connected to the inlet and to the outlet of the respective measuring tubes.

Measuring tube arrangements of the prior art are generally welded to a carrier tube having an inlet and outlet. A subsequent replacement of the measuring tube arrangement is not possible at all or is only laboriously possible. Through the additional provision of a connecting body with mounting surfaces, via which a positive and/or non-positive connection to a carrier unit can be realized, the possibility is opened up to replace the measuring tube arrangement of the measuring device if necessary.

An additional connecting body, which connects the inlet of the measuring tube arrangement to the outlet of the measuring tube arrangement, moreover enables the entire measuring tube arrangement, in particular the part that is configured to be set into vibrations, to be decoupled from the environment. Alternatively, mounting surfaces could be provided on the measuring tubes. However, this is disadvantageous since the forces that then act on the measuring tubes, which are designed to be optimally thin, may lead to deformations of the channel for conducting the medium, which is disadvantageous in terms of fluidics and has immense influence on the vibration properties of the measuring tubes.

The connecting body can be formed in two parts, wherein a first part is integrally bonded, and the second part is positively connected to the respective measuring tubes. Furthermore, the connecting body, or the second part of the connecting body, can assume the function of a process connection and/or a flow distributor.

It is advantageous if the connecting body or a part of the connecting body is solid.

Advantageous embodiments of the invention are the subject matter of the dependent claims.

One embodiment provides that the inlet direction and the outlet direction are oriented oppositely.

This forms the basis for a simplified geometry of the measuring tubes, which leads to the measuring tubes not only being able to be inserted into the carrier unit in an assembly-friendly manner but also being easily accessible for hose systems and/or plastic tube systems.

One embodiment provides that the measuring tubes respectively have two legs whose respective longitudinal axes run in parallel to one another.

One embodiment provides that the measuring tubes respectively have a longitudinal plane which divides the measuring tube into two sides, wherein the two longitudinal axes of the legs of a measuring tube run in the respective longitudinal plane, wherein the magnet arrangements are arranged on the sides, facing away from one another, of the measuring tubes.

Coriolis flow meters are known in which the magnets are attached to one of the two sides, facing one another, of the two measuring tubes. For example, this is taught in WO 2019/017891 A1 and EP 1 296 119 A1. Although such an embodiment has the advantage that the number of coils can be reduced, it has the disadvantage either that the vibration exciter and the vibration sensors must be attached to the measuring tube arrangement, and thus are also part of the disposable arrangement, or that the vibration exciter and the vibration sensors must be attached in a carrier arrangement which, in the installed state of the measuring tube arrangement, extends between the two measuring tubes and may thus sterically hinder the insertion of the measuring tube arrangement into the carrier unit. According to the invention, the magnet arrangements are arranged on the sides, facing away from one another, of the measuring tube so that the coil arrangements may be arranged in the side surfaces, facing one another, of a receptacle of the carrier unit, and an insertion of the measuring tube arrangement by the user is simplified.

One embodiment provides that the measuring tubes respectively have a measuring tube body, in particular a metallic measuring tube body with a wall thickness of less than 1 millimeter, in particular less than 0.7 millimeters, and preferably less than 0.25 millimeters.

One embodiment provides that the measuring tubes respectively have at least one at least partially planar attachment surface, wherein the at least one magnet is arranged on the at least one attachment surface.

The attachment surface may be arranged or incorporated directly on the respective measuring tubes or be provided by an intermediate piece which is arranged between measuring tube and magnet. The intermediate piece is connected positively or integrally to the respective measuring tube.

One embodiment provides that the connecting body has, in particular, planar mounting surfaces for mechanically detachable installation of the measuring tube arrangement in a carrier unit in a defined position, in particular a position defined by the mounting surfaces.

The measuring tube system according to the invention comprises:
- a measuring tube arrangement, in particular the measuring tube arrangement according to the invention; and
- a hose system and/or plastic tube system, preferably for flow measurement in automated industrial or laboratory installations,
wherein the measuring tube arrangement is connected to the hose system and/or plastic tube system and is configured to measure the flow rate and/or the volumetric flow and/or the mass throughflow of the flowable medium.

One embodiment provides that the measuring tube arrangement and the hose system and/or plastic tube system are arranged in a container, in particular a sterilization bag, which is designed to maintain sterility of the measuring tube arrangement and of the hose system and/or plastic tube system until the container is opened, wherein the measuring tube system is sterilized by means of radiation sterilization, preferably gamma radiation sterilization or electron beam sterilization, hot steam sterilization, and/or gas sterilization.

There is a high demand for automated process monitoring in biomedical applications. Sterilized measuring components are essential for such applications. It is therefore advantageous if the measuring tube system is sterilized in particular via gamma radiation sterilization, and the sterility is maintained by the accommodation of the measuring tube system in a container. Suitable containers are preferably plastic bags which essentially allow gamma rays and/or electron beams to pass through completely but are impermeable to contaminants and germs.

One embodiment provides that at least one process monitoring unit is connected to the hose system and/or plastic tube system, wherein the process monitoring unit comprises a pressure measuring transducer; a temperature sensor; a scale; a pH sensor; a density sensor; a flow meter for determining a mass throughflow, a volumetric flow, and/or a flow rate; a flow switch; a fill-level sensor; a conductivity sensor; a concentration sensor; an oxygen sensor; and/or a turbidity sensor.

The carrier unit, according to the invention, of a measuring device for detecting a mass throughflow, a viscosity, a density, and/or a variable derived therefrom, of a flowable medium, comprising:
- a carrier unit body for fastening a measuring tube arrangement, in particular the measuring tube arrangement according to the invention, or a measuring tube system, in particular the measuring tube system according to the invention,
  - wherein the carrier unit body has a receptacle for the measuring tube arrangement,
  - wherein the carrier unit body has at least two opposing side surfaces which delimit the receptacle transversely to the longitudinal direction of the measuring tube arrangement;
- at least one vibration exciter which is configured to excite the measuring tube arrangement to vibrate,
wherein the at least one vibration exciter is arranged on one of the opposing side surfaces or between the tubes; and
- at least two vibration sensors which are configured to detect the deflection of the vibrations of the measuring tube arrangement,
wherein the vibration sensors are arranged on the opposing side surfaces,
  wherein the vibration sensors are arranged at an offset from the vibration exciter in the longitudinal direction.

One embodiment provides that a vibration sensor has two coil devices which are arranged at an offset from one another in the longitudinal direction of the carrier unit body, in particular in the longitudinal direction of the receptacle.

One embodiment provides that the vibration exciter and the vibration sensor respectively have at least one coil device, wherein the coil devices are respectively arranged in a recess in the carrier unit body.

This enables an insertion of the measuring tube arrangement into the receptacle of the carrier unit without steric hindrance by the coil device.

One embodiment provides that the coil devices comprise at least one printed circuit board coil.

Printed circuit board coils as components of the vibration exciter and/or vibration sensors are already known. It is advantageous that the embedding of the printed circuit board coils into the side surfaces of the receptacle can be realized in a structurally simple manner.

One embodiment provides that the carrier unit body has an end face in which the receptacle is arranged, wherein the end face is designed as a bearing surface for a connecting body of the measuring tube arrangement.

Carrier body units with bearing surfaces on which the connecting body may rest are particularly advantageous with respect to carrier units which clamp the measuring tube arrangement. Such an embodiment is known from WO 2019/017891 A1, for example. In this case, the measuring tube arrangement is arranged in a carrier unit with attachment parts such that the attachment parts produce a force in the longitudinal direction of a base plate and hold the measuring tube arrangement in position not only positively but also non-positively.

A bearing surface is a support surface on which something rests or on which something may be placed. The perpendicular of the bearing surface in this case does not necessarily need to point in the direction of gravity. By applying a force with a force direction parallel to the perpendicular, the measuring tube arrangement is better fixed in the carrier unit and decoupled against disturbing influences.

One embodiment provides that a fixing device is arranged on the end face, which fixing device is configured to produce a non-positive connection between measuring tube arrangement, in particular connecting body, and carrier unit body, wherein the non-positive connection is realized via a force action of the fixing device on the connecting body in the longitudinal direction of the receptacle.

An advantage of the embodiment is that better decoupling of the vibrating measuring tubes from the environment can be realized by an additional fixing device. The fixing device is configured to hold the measuring tube arrangement non-positively in the position predetermined by the mounting surfaces.

Screw elements, terminal elements, snap-in elements, or a clamping device are suitable as fixing device.

One embodiment provides that the at least two parallel side surfaces respectively have a guide which extend perpendicularly to the longitudinal direction of the receptacle and is designed to form a positive connection between connecting body of the measuring tube arrangement and carrier unit body.

An advantage of the embodiment is the simplification of the assembly through a guide introduced in the opposing side surfaces, which guide is designed such that the connecting body can be inserted positively into the guide. The distance between magnet device and coil device is thereby additionally adjustable in a reproducible manner.

A measuring device according to the invention for detecting a mass throughflow, a viscosity, a density, and/or a variable derived therefrom, of a flowable medium, comprising:
 a measuring tube arrangement, in particular the measuring tube arrangement according to the invention, or a measuring tube system, in particular the measuring tube system according to the invention;
 a carrier unit, in particular the carrier unit according to the invention,
wherein the measuring tube arrangement is arranged in the receptacle of the carrier unit and is mechanically detachably connected to the carrier unit;
 a measuring and/or operating circuit,
  wherein the measuring and/or operating circuit is configured to operate the vibration sensors and the vibration exciter and is connected thereto,
  wherein the electronic measuring and/or operating circuit is furthermore configured to determine and provide mass throughflow measurement values, viscosity values, and/or density measurement values, and/or temperature measurement values, and/or diagnostic measurement values, and/or values of a variable derived therefrom.

One embodiment provides that the measuring and/or operating circuit is configured to determine at which coil device the detected magnetic field is greatest, and to use the measurement values determined by means of the particular coil device for determining the mass throughflow, the viscosity, the density, and/or the variable derived therefrom, of the flowable medium.

It is advantageous if the measuring device comprises a plurality of coil arrangements which are configured independently of one another to determine vibration properties of the measuring tubes. According to the invention, they are arranged at an offset from one another in the longitudinal direction of the receptacle. This enables the use of measuring tube arrangements with varying magnet positions. This can be caused, for example, by different nominal widths or lengths of the measuring tubes.

According to the invention, the measuring and/or operating circuit is configured to detect at which coil the greatest magnetic field is determined, and to use this determined measurement signals for the determination of the flow measurement variable. It is advantageous that a carrier unit is thus suitable for a plurality of measuring tube arrangements with different geometries, nominal widths, lengths, and magnetic positions.

One embodiment provides that the connecting body of the measuring tube arrangement rests on a bearing surface of the carrier unit body, wherein the bearing surface has a perpendicular with a direction parallel to the longitudinal direction of the receptacle, wherein the carrier unit body has a fixing device which is configured to connect the measuring tube arrangement, in particular the connecting body, non-positively to the carrier unit body, wherein the non-positive connection is realized by a force action in the direction of the longitudinal direction of the receptacle.

BRIEF DESCRIPTION OF THE DRAWINGS

The invention is explained in greater detail with reference to the following figures. The following are shown.

DETAILED DESCRIPTION

Figure 1:
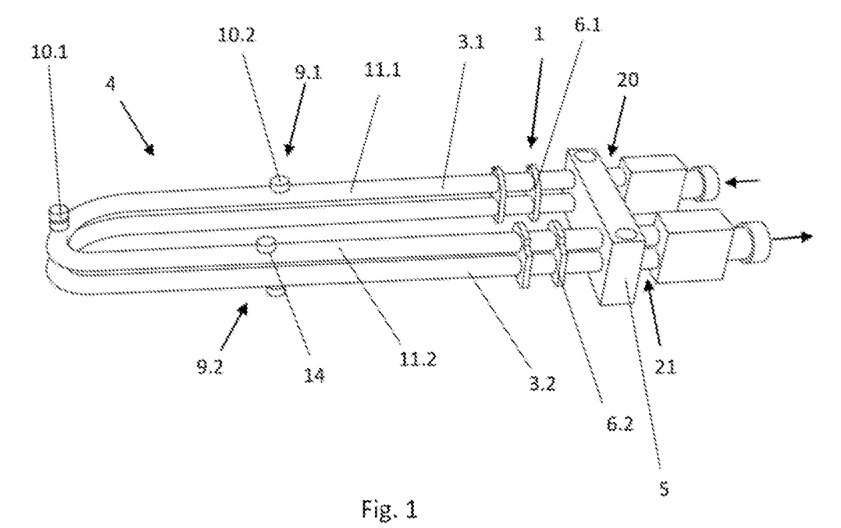
FIG. 1 shows an embodiment of the measuring tube arrangement according to the present disclosure.

FIG. 1 shows an embodiment of the measuring tube arrangement 4 according to the invention. The measuring tube arrangement 4 is suitable for being replaceably inserted into a measuring device. For this purpose, only individual components of the vibration exciter and of the vibration sensors, in this case the respective magnet arrangements 9.1, 9.2, are attached to the measuring tube arrangement 4. The further components are arranged in a carrier unit (not depicted), in particular in the receptacle, which is suitable for receiving the measuring tube arrangement 4. The measuring tube arrangement 4 comprises two bent measuring tubes 3.1, 3.2 which run in parallel to one another and are connected to one another via a coupler arrangement 1 consisting of four coupler elements 6, and via a connecting body 5. Two coupler elements 6.1 are connected in an integrally bonded manner in the inlet 20, and two coupler elements 6.2 are connected in an integrally bonded manner in the outlet of the respective measuring tubes 3.1, 3.2. A flow divider which has a process connection for connecting to a hose system and/or plastic tube system is respectively arranged in the inlet 20 and in 21. The measuring tubes 3.1, 3.2 are shaped such that the flow direction, represented by two arrows, in the inlet 20 is oriented oppositely to the flow direction in the outlet 21. According to a further embodiment, a flow divider body can be provided instead of two separate flow dividers, which flow divider body is slid onto the inlet 20 and outlet 21 and also contributes to decoupling the measuring tube arrangement 4 from the environment after installation in the carrier unit. The individual coupler elements 6 are plate-shaped and are in one or two parts. The coupler elements may respectively completely or only partially encompass the measuring tubes. The measuring tubes 3.1, 3.2 are U-shaped, i.e., they respectively have two legs which run substantially in parallel to one another and are connected via a bent partial segment. A magnet arrangement 9.1, 9.2 is arranged on each measuring tube 3.1, 3.2. In the bent partial segment, a magnet 10.1 of the magnet arrangement 9.1 is arranged and forms a component of the vibration exciter. A magnet 10.2 which forms a part of the vibration exciter is respectively attached in the respective legs. The magnets 10 are attached to attachment surfaces 14. In the embodiment, the attachment surfaces 14 are located on the respective measuring tubes 3.1, 3.2.

Figure 2:
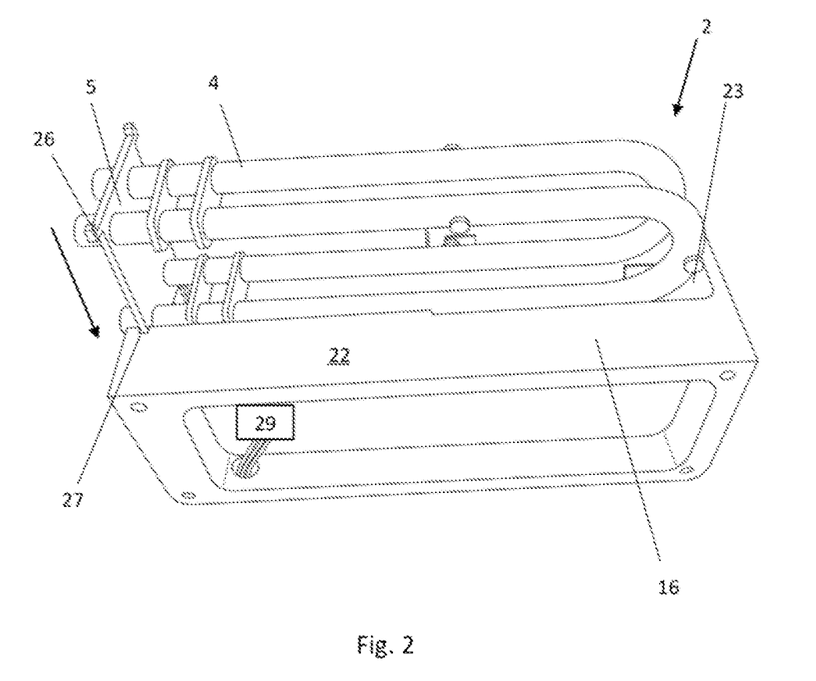
FIG. 2 shows an embodiment of the measuring device according to the present disclosure.

FIG. 2 shows an embodiment of the measuring device 2 according to the invention. A measuring tube arrangement 4 is partially inserted into a receptacle 23 of a carrier unit 16. An arrow indicates the insertion direction. In the embodiment, the latter runs perpendicularly to a longitudinal direction of the receptacle 23. According to a further advantageous embodiment (not depicted), the carrier unit 16 has a measuring and/or operating circuit 29 which is connected to the vibration exciters and vibration sensors, in particular to the respective coil systems, and is configured to generate and/or detect a temporally alternating magnetic field.

The carrier unit 16 has a carrier unit body 22 in which the receptacle 23 is located. The connecting body 5 of the measuring tube arrangement 4 has mounting surfaces 26 which serve to arrange the measuring tube arrangement 4 in a predetermined position in the carrier unit 16. According to the depicted embodiment, the perpendicular of the mounting surface 26 points perpendicularly to the longitudinal direction of the measuring tube arrangement 4. According to a further advantageous embodiment, the perpendicular of the mounting surface 26 points in the direction of the longitudinal direction of the measuring tube arrangement 4. The surface of the carrier unit body 22 in contact with the mounting surface 26 of the connecting body 5 is the bearing surface 27.

Figure 3:
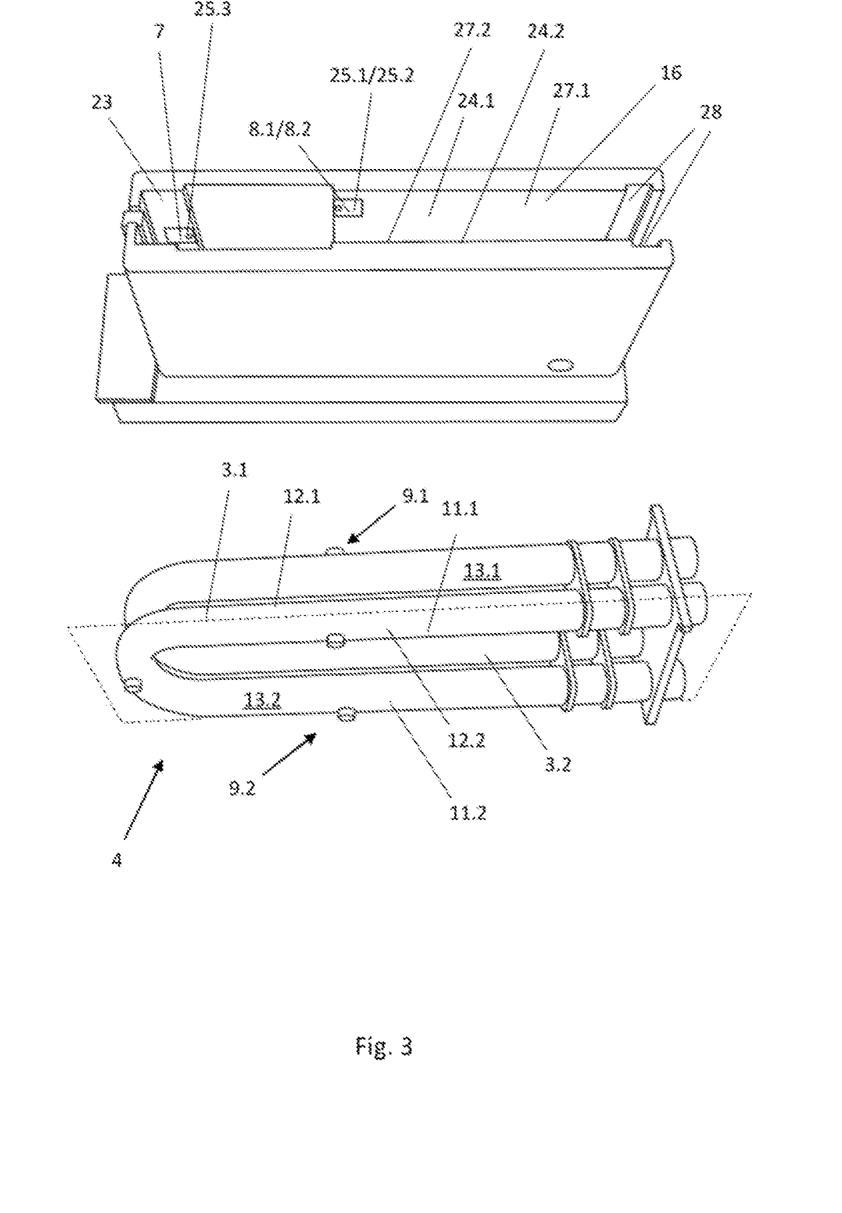
FIG. 3 shows a perspective view of an embodiment of the carrier unit according to the present disclosure and a measuring tube arrangement.

FIG. 3 shows a perspective view of an embodiment of the carrier unit 16 according to the invention and of the measuring tube arrangements 4. The carrier unit 16 has two side surfaces 24.1, 24.2 which are oriented in parallel to one another and delimit the receptacle 23 transversely to the longitudinal direction of the receptacle. The coil devices 25.1, 25.2 of the vibration sensors 8.1, 8.2 and the coil device 25.3 of the vibration exciter 7 are arranged in the side surfaces 24.1, 24.2. The coil devices 25.1, 25.2 are arranged in the longitudinal direction of the receptacle with respect to the coil device 25.3. All three coil devices 25.1, 25.2, 25.3 are located in one coil plane. Furthermore, the three coil devices 25.1, 25.2, 25.3 are designed as a plate coil and embedded into the side surface 24.1. At the side surface 24.2, three coil devices are arranged substantially opposite the three coil devices 25.1, 25.2, 25.3. A respective guide 28 which extends perpendicularly to the longitudinal direction of the receptacle 23 and in parallel to the coil plane is incorporated into the two side surfaces 24.1, 24.2. According to the depicted embodiment, the receptacle extends over two end faces of the receptacle 23. This enables an insertion of the measuring tube arrangement 4 perpendicularly to the longitudinal direction of the measuring tube arrangement 4. According to a further advantageous embodiment, the receptacle extends exclusively over one end face. In this case, the measuring tube arrangement 4 is to be inserted into the carrier unit 16 in the longitudinal direction of the measuring tube arrangement 4.

The depicted measuring tube arrangement 4 has two bent measuring tubes 3.1, 3.2 which respectively comprise a measuring tube body 13.1, 13.2 which is formed from a material which comprises a metal, a ceramic, a plastic, and/or a glass. A longitudinal plane, in which the longitudinal axes of the legs 11.1, 11.2 run, divides the respective measuring tube 3.1, 3.2 into two sides 12.1, 12.2. The magnet arrangements 9.1, 9.2 are attached to the sides 12.2 facing away. The depicted measuring tube arrangement 4 differs from the measuring tube arrangement 4 of FIG. 1 in that no process connection and/or flow divider is arranged in the inlet and outlet. Plastic flow dividers are known which are integrated into the hose system and/or plastic tube system to be attached to the measuring tube arrangement 4.

Figure 4:
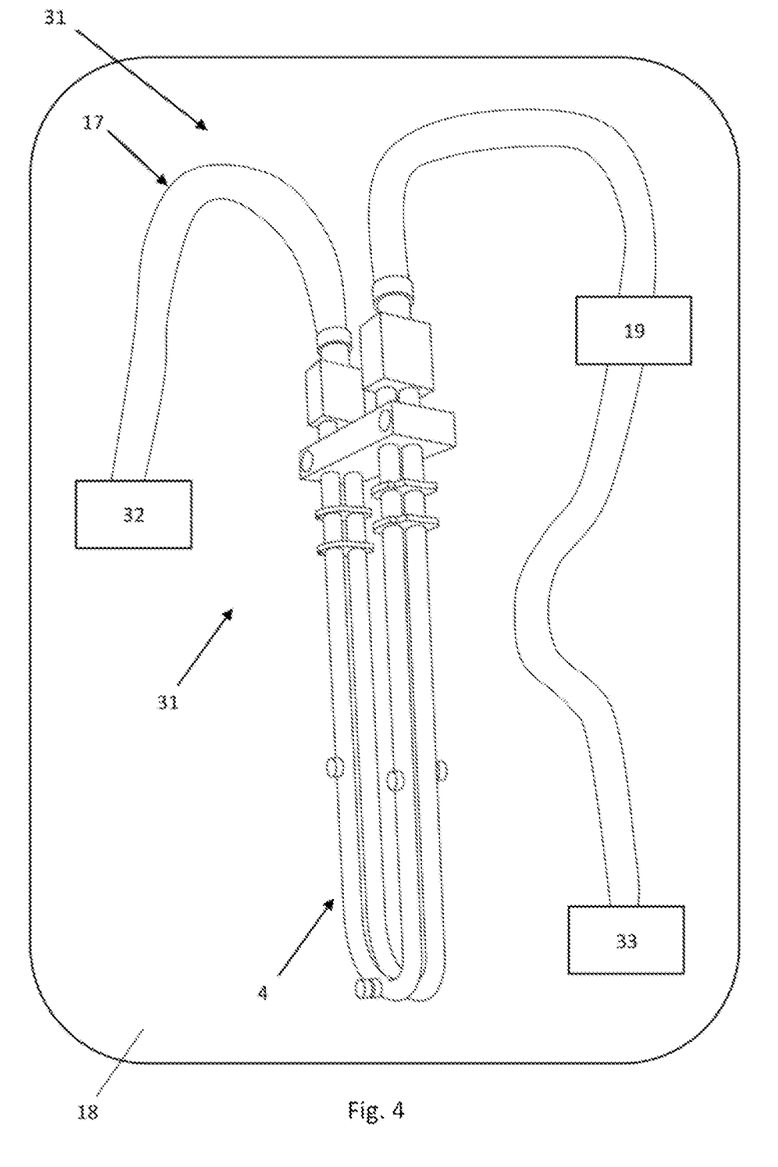
FIG. 4 shows an embodiment of the measuring tube system according to the present disclosure.

FIG. 4 shows an embodiment of the measuring tube system 31 according to the invention. A measuring tube arrangement 4 is connected via the process connections to a hose system and/or plastic tube system 17. A process monitoring unit 19 is integrated in the hose system and/or plastic tube system 17. The hose system and/or plastic tube system 17 has a bioprocess bag 33 and a connection element 32 with which the measuring tube system 31 may be connected to a process line. The entire measuring tube system 31 is located in a container 18.

In this case, the container 18 is a sterilization bag which is suitable for sterilization methods based on ionizing radiation.

Figure 5:
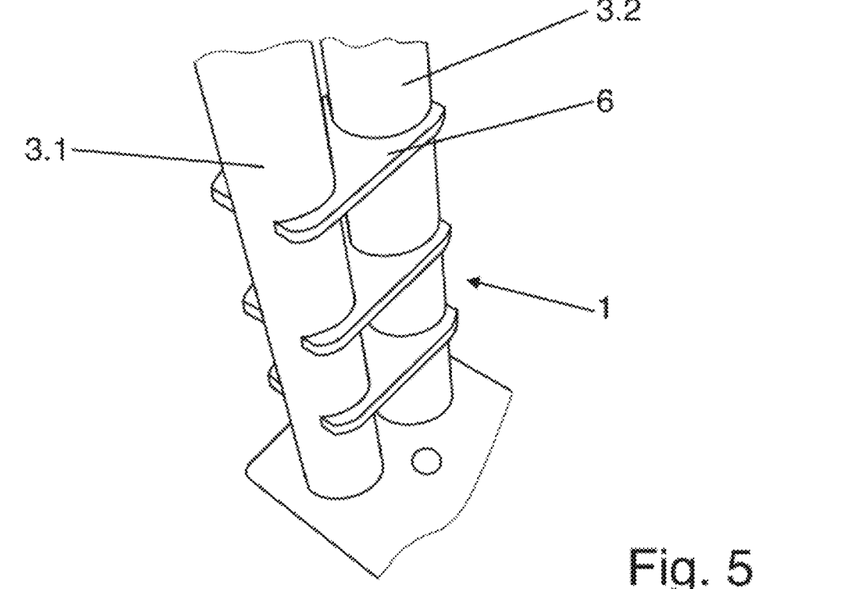
FIG. 5 shows a close-up view of an embodiment of the coupler arrangement.

FIG. 5 shows a close-up view of an embodiment of the coupler arrangement 1 with three coupler elements 6 which, in the inlet region or outlet region, are arranged between two measuring tubes 3.1, 3.2 running in parallel, and connect them to one another. The respective coupler elements 6 are plate-shaped and respectively have two openings through which a respective one of the two measuring tubes 3.1, 3.2 runs. The coupler elements 6 encompass the measuring tubes 3.1, 3.2 only to such an extent that the coupler elements 6 do not exceed a first reference plane delimiting the measuring tubes 3.1 perpendicularly to the flow direction and do not exceed a second reference plane delimiting the measuring tubes 3.2 perpendicularly to the flow direction. A longitudinal plane of the measuring tube arrangement in which the longitudinal axes of the measuring tubes 3.1, 3.2 also lie intersects the reference plane perpendicularly. Such an embodiment avoids projecting coupler elements 6, which may collide with the carrier body itself or other parts of the arrangement upon insertion of the measuring tube arrangement into the carrier unit. The coupler elements 6 are integrally connected to the measuring tubes 3.1, 3.2, in particular by a soldered connection.

Figure 6:
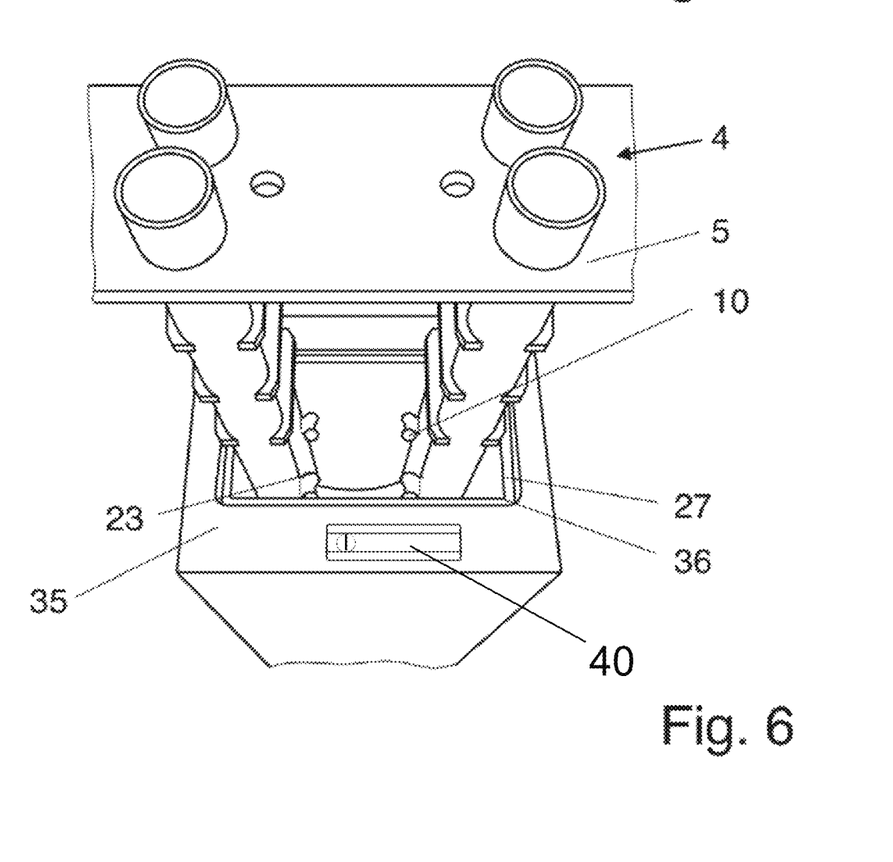
FIG. 6 shows a measuring tube arrangement which is inserted into a receptacle of a carrier unit.

FIG. 6 shows a measuring tube arrangement 4 which is inserted into a receptacle 23 of a carrier unit 16. The depicted carrier unit 16 has an end face 35 in which are arranged the receptacle 23 and the bearing surface 27 for the connecting body 5 of the measuring tube arrangement 4. Unlike the embodiment of the carrier unit 16 depicted in FIG. 3, the receptacle 23 extends exclusively on an end face 35 of the carrier unit 16; the receptacle 23 moreover has no guide. Instead, the receptacle 23 has a recess 36 which also comprises the bearing surface 27 and is formed substantially complementary to the connecting body 5 of the measuring tube arrangement 4. The measuring tube arrangement 4 is inserted into the receptacle 23 of the carrier unit 16 via a movement directed in the longitudinal direction of the measuring tube arrangement 4. In the installed state, the mounting surface of the measuring tube arrangement 4 is in contact with the bearing surface 27 of the carrier unit 16. A fixing device 40 is arranged on the end face 35, which fixing device 40 is configured to produce a non-positive connection between measuring tube arrangement 4, in particular connecting body 5, and carrier unit body 22, wherein the non-positive connection is realized via a force action of the fixing device 40 on the connecting body 5 in the longitudinal direction of the receptacle 23.

The depicted embodiment of the measuring tube arrangement 4 has measuring tubes 3.1, 3.2 respectively having a measuring tube outer surface, wherein the respective measuring tube outer surface is delimited by two reference planes which run in parallel to one another and are tangent to the measuring tube outer surfaces in the inlet region and in the outlet region. A magnet of the vibration exciter or of the vibration sensor is attached exclusively to the respective measuring tubes 3.1, 3.2 in such a way that it does not exceed the two reference planes.

Figure 7:
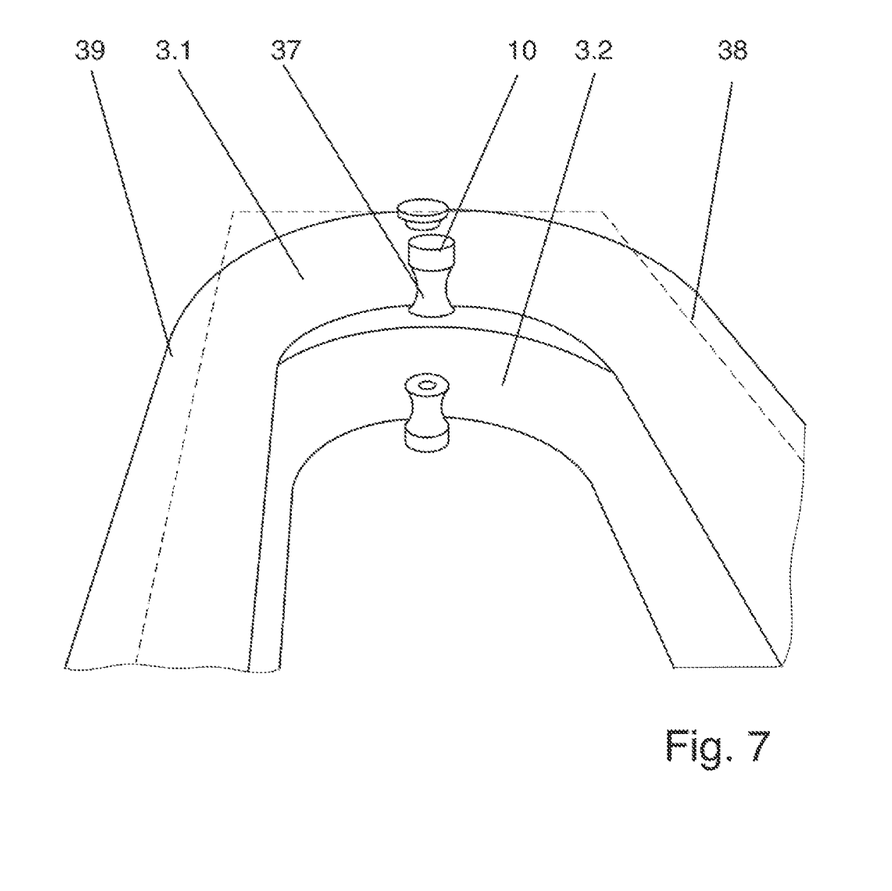
FIG. 7 shows a close-up view of an embodiment of the magnet holder with attached magnets.

FIG. 7 shows a close-up view of an embodiment of a magnet holder 37, arranged in the bent partial segment of the measuring tube 3.1, 3.2, with attached magnets 10. The magnet holder 37 is integrally connected to the respective measuring tube 3.1, 3.2. The magnet 10 is not connected directly to the measuring tube 3.1, 3.2 but rather is connected via the magnet holder 37 to which the magnet 10 is integrally connected. The magnet holder 37 is preferably made of a non-magnetic material.

The two measuring tubes 3.1, 3.2 forming a measuring tube arrangement respectively have an outer surface 39. In the inlet region and outlet region, two reference planes 38.1, 38.2 running in parallel to one another are tangent to the outer surface of the measuring tube 3.1, 3.2. A longitudinal plane intersecting the longitudinal axis of the measuring tube in the inlet region and the longitudinal axis of the measuring tube in the outlet region runs in parallel to the two reference planes 38.1, 38.2. The two reference planes 38.1, 38.2 delimit a region in which the magnet carrier 37 with the attached magnet 10 may be located. Projecting components of the measuring tube arrangement 4 are thus avoided, which leads to a secure mounting of the measuring tube arrangement 4 in the carrier unit.

The invention claimed is:

1. A measuring device for detecting a mass flow rate, a viscosity, a density, and/or a variable derived therefrom, of a flowable medium, the measuring device comprising:
    a measuring tube arrangement, comprising:
        two measuring tubes, which extend parallel to each other, configured to conduct the flowable medium therethrough, wherein each measuring tube includes an inlet having an inlet direction and an outlet having an outlet direction, and wherein each measuring tube is bent at least once between the inlet and the outlet;
        a coupler arrangement configured to mechanically couple the two measuring tubes, the coupler arrangement including at least two coupler elements, wherein one coupler element of the at least two coupler elements is disposed at the inlet, and wherein another coupler element of the at least two coupler elements is disposed at the outlet;
        two magnet arrangements arranged on the two measuring tubes, wherein precisely one magnet arrangement is arranged on one measuring tube of the two measuring tubes, and wherein each magnet arrangement includes at least two magnets; and
        a connecting body connected to each inlet and each outlet of the respective measuring tubes;
    a carrier unit, comprising:
        a carrier unit body configured to enable mounting the measuring tube arrangement, wherein the carrier unit body includes a receptacle adapted to accept the measuring tube arrangement and includes at least two opposing side surfaces that bound the receptacle transversely to a longitudinal direction of the measuring tube arrangement or to a longitudinal direction of the carrier unit body;
        at least one vibration exciter configured to excite the measuring tube arrangement to vibrate, wherein the at least one vibration exciter is disposed on one of the opposing side surfaces; and
        at least two vibration sensors, each including at least one coil device, configured to detect deflections of vibrations of the measuring tube arrangement, wherein the at least two vibration sensors are:
            disposed on the opposing side surfaces:
            arranged at an offset from the at least one vibration exciter in the longitudinal direction; and
            offset in a longitudinal direction of the receptacle,
        wherein the measuring tube arrangement is disposed in the receptacle of the carrier unit, and wherein the connecting body is configured to enable mechanically detachably connecting the measuring tube arrangement to the carrier unit; and
    a measuring and/or operating circuit configured to:
        operate the at least two vibration sensors and the at least one vibration exciter, the measuring and/or operating circuit connected thereto;
        determine at which coil device a detected magnetic field is greatest; and
        use measurement values from the determined coil device to determine and provide at least one of mass flow rate measurement values, viscosity values, density measurement values, temperature measurement values, diagnostic measurement values, and values of a variable derived therefrom the preceding values of the flowable medium.

2. The measuring device of claim 1, wherein the inlet direction and the outlet direction are oriented oppositely.

3. The measuring device of claim 1, wherein each measuring tube includes two legs whose respective longitudinal axes extend parallel to each other.

4. The measuring device of claim 3, wherein each measuring tube includes a longitudinal plane that divides the respective measuring tube into two sides,
wherein each longitudinal axis of the corresponding leg of the corresponding measuring tube extends in the respective longitudinal plane, and
wherein each magnet arrangement is disposed on a side of the two sides of its respective measuring tube which faces away from the other measuring tube.

5. The measuring device of claim 3, wherein the at least two magnets of each magnet arrangement are disposed exclusively in a partial volume delimited by two parallel reference planes and an outer surface of one of the two measuring tubes,
wherein the reference planes extend parallel to a longitudinal plane extending through the two longitudinal axes of the legs of the respective measuring tube, and
wherein the reference planes contact the outer surface.

6. The measuring device of claim 1, wherein each measuring tube comprises a measuring tube body having a wall thickness of less than 1 millimeter.

7. The measuring device of claim 1, wherein each measuring tube includes at least one at least partially planar attachment surface,
wherein at least one magnet of the at least two magnets of the magnet arrangement is disposed on the at least one attachment surface.

8. The measuring device of claim 1, wherein the connecting body includes planar mounting surfaces configured to enable mechanically detachable installation of the measuring tube arrangement into the carrier unit in a position defined by the mounting surfaces.

9. The measuring device of claim 1, further comprising:
a hose system and/or plastic tube system configured to enable flow measurement in automated industrial or laboratory installations,
wherein the measuring tube arrangement is connected to the hose system and/or plastic tube system and is configured to measure at least one of a flow rate, a volumetric flow rate, and the mass flow rate of the flowable medium.

10. The measuring device of claim 9, wherein the measuring tube arrangement and the hose system and/or plastic tube system are disposed in a container configured to maintain a sterility of the measuring tube arrangement and of the hose system and/or plastic tube system until the container is opened,
wherein the measuring tube system is sterilized by at least one of radiation sterilization, hot steam sterilization, and gas sterilization, wherein the radiation sterilization includes gamma radiation sterilization or electron beam sterilization.

11. The measuring device of claim 9, wherein at least one process monitoring unit is connected to the hose system and/or plastic tube system,
wherein the at least one process monitoring unit comprises at least one of: a pressure measuring transducer; a temperature sensor; a scale; a pH sensor; a density sensor; a flow meter for determining a mass flow rate, a volumetric flow and/or a flow rate; a flow switch; a fill-level sensor; a conductivity sensor; a concentration sensor; an oxygen sensor; and a turbidity sensor.

12. The measuring device of claim 1, wherein each vibration sensor comprises precisely two coil devices that are disposed at an offset from each other in the longitudinal direction of the carrier unit body.

13. The measuring device of claim 1, wherein the at least one vibration exciter comprises at least one coil device, wherein the coil devices of the at least one vibration exciter and the at least two vibration sensors are respectively disposed in corresponding recess in the carrier unit body.

14. The measuring device of claim 13, wherein each coil device comprises at least one printed circuit board coil.

15. The measuring device of claim 1, wherein the carrier unit body includes an end face in which the receptacle is disposed, wherein the end face is configured as a bearing surface for the connecting body of the measuring tube arrangement.

16. The measuring device of claim 15, wherein, at the end face, a fixing device is disposed, which is configured to effect a non-positive connection between the connecting body of the measuring tube arrangement and the carrier unit body, wherein the non-positive connection is effected via a force action of the fixing device on the connecting body in a longitudinal direction of the receptacle.

17. The measuring device of claim 15, wherein the end face includes an end recess in which the bearing surface for the connecting body of the measuring tube arrangement is disposed.

18. The measuring device of claim 1, wherein each of the at least two opposing side surfaces of the carrier unit body includes a guide extending perpendicular to a longitudinal direction of the receptacle, the guide configured to effect a positive connection between the connecting body of the measuring tube arrangement and carrier unit body.

19. The measuring device of claim 1, wherein the connecting body of the measuring tube arrangement seats on a bearing surface of the carrier unit body, wherein the bearing surface has a normal having a direction parallel to a longitudinal direction of the receptacle,
wherein the carrier unit body includes a fixing device configured to connect the connecting body of the measurement tube arrangement non-positively to the carrier unit body, wherein the non-positive connection is effected by a force action in the direction of the longitudinal direction of the receptacle.

* * * * *